United States Patent [19]

Sanderson et al.

[11] 4,299,786

[45] Nov. 10, 1981

[54] WASTE HEAT DISPOSAL PROCESS

[75] Inventors: William G. Sanderson; Richard B. Sumner; Loren G. Kragh, all of Tacoma, Wash.

[73] Assignee: Tower Systems Inc., Tacoma, Wash.

[21] Appl. No.: 201,550

[22] Filed: Oct. 28, 1980

[51] Int. Cl.³ .............................................. B01F 3/04
[52] U.S. Cl. ............................... 261/128; 159/4 CC; 159/48 R; 159/49; 165/60; 261/23 R; 261/112; 261/153; 261/DIG. 11; 261/DIG. 46
[58] Field of Search ..................... 261/23 R, 112, 128, 261/153, DIG. 11, DIG. 46; 165/2, 60, DIG. 1; 210/774; 159/4 B, 4 CC, 48 R, 49

[56] References Cited

U.S. PATENT DOCUMENTS

| | | | |
|---|---|---|---|
| 2,276,970 | 3/1942 | Hibberd | 165/60 |
| 2,826,397 | 3/1958 | Lofgren et al. | 261/128 |
| 3,094,133 | 6/1963 | Treanor | 261/DIG. 46 |
| 3,754,741 | 8/1973 | Whitehurst et al. | 261/DIG. 46 |
| 4,019,951 | 4/1977 | Kragh | 159/4 CC |
| 4,125,148 | 11/1978 | Molitor | 261/128 X |
| 4,252,752 | 2/1981 | Flandroy | 261/112 X |

Primary Examiner—Richard L. Chiesa
Attorney, Agent, or Firm—Richard W. Hanes

[57] ABSTRACT

This invention relates to an improved waste heat disposal process characterized primarily by splitting the total cooling load between two or more open-looped evaporative cooling circuits, staging the circuits in series such that each successive circuit has a greater dissolved solids carrying capacity than the preceding one, using the brine blown down from a preceding circuit as the coolant circulated within the next succeeding one, and treating only the blowdown from one circuit to the relatively greater extent necessary to accommodate the increased solids-carrying capacity of the next. The invention also includes the feature of essentially staging the heat load by dividing same into two or more parts and handling the different parts by separate and distinct evaporative cooling loops.

11 Claims, 4 Drawing Figures

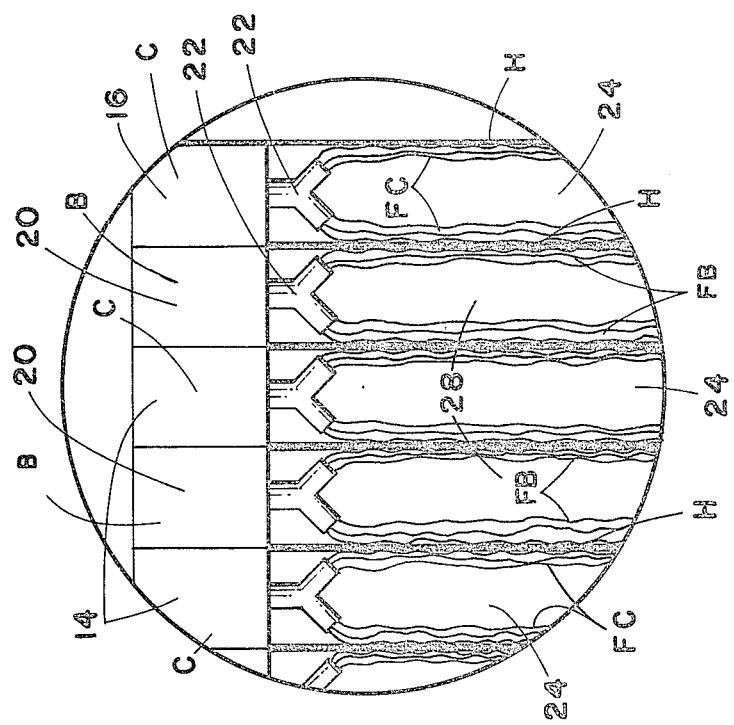
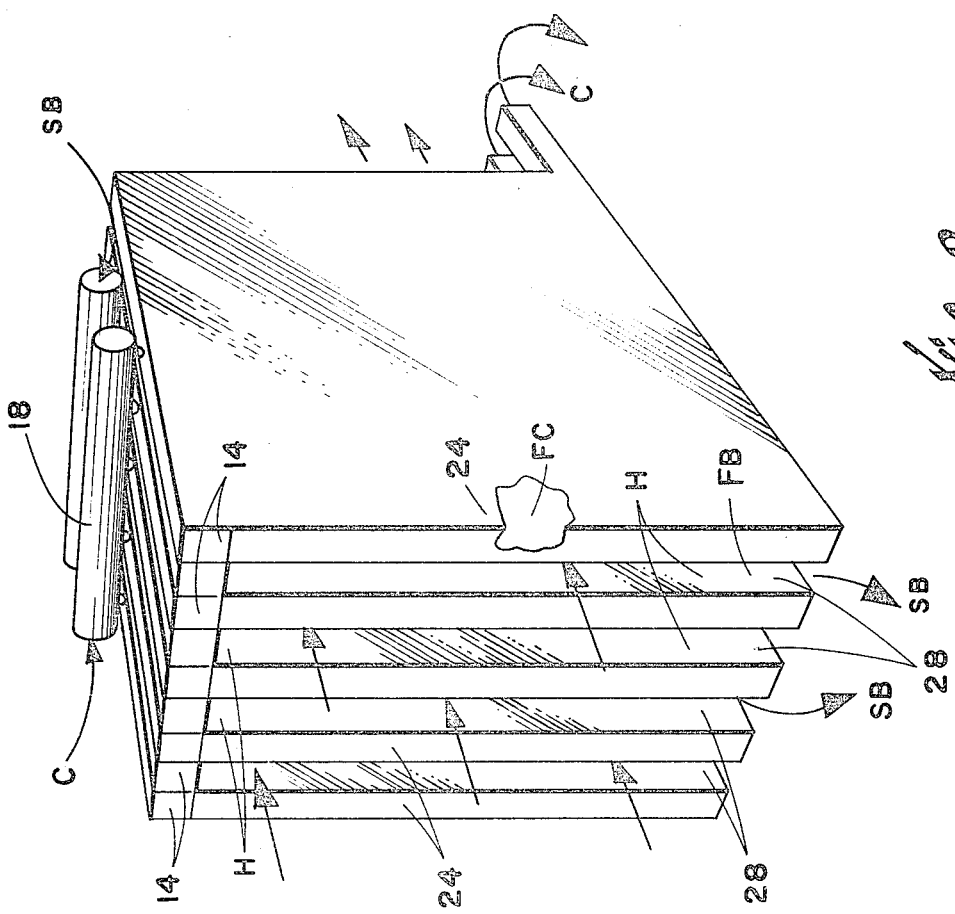

WASTE HEAT DISPOSAL PROCESS

In recent years the declining quantity and quality of raw water resources together with the associated wastewater management problems facing many industries needing vast amounts of water for cooling purposes are having a significant effect upon the cost, design and sometimes even the location of large industrial plants, power plants and the like. Solutions using state-of-the-art technology are hard to come by, especially when much of the engineering community views wastewater management as an entirely separate, distinct and unrelated problem to that of designing a proper evaporative cooling system. The true fact of the matter is that these two problems are intimately interrelated and a cost effective and environmentally acceptable high recycle evaporative heat rejection system must take cognizance of both.

In the past, the traditional approach has been one of treating the makeup and/or the primary circulating water system to remove the waste heat therefrom using evaporative techniques and repeated recycling until the total dissolved solids reached a level of 5,000 to 30,000 mg/l depending upon the chemistry of the particular raw water source and upon the physical characteristics of the circulating water system. The required dissolved solids concentration was maintained by wasting (blowing down) a quantity of the water to solar ponds or some other on-site disposal facility. Not infrequently, the wastewater has been returned to the source with the resultant heat and chemical contamination and other environmentally unacceptable consequences.

Under current environmental controls, the surface discharge of wastewater is only permitted when a raw water source of high quality is used for makeup and that water is only moderately concentrated before discharge. Such sources are few and far between in those areas of the country like the arid Southwest where agricultural and domestic needs take precedence over industrial ones in the use of this limited resource. For instance, a 50 megawatt geothermal power plant will consume between 4000 and 5000 acre feet of water annually for evaporative heat rejection. Moreover, it is not uncommon to find the only water available for reuse containing TDS is excess of 5000 mg/l, a chloride content amounting to half or more of the TDS and a BOD level in the range of 1000 or so mg/l. Water of such quality is unsuitable for practical direct cooling and it requires extensive front end treatment for BOD and hardness removal since, once it has been taken from the source and used, it cannot be returned. Furthermore, in a geothermal plant as opposed to a fossil fuel-fired plant of equivalent capacity, the former generates three to six times more waste heat and, therefore, requires more in the way of capital investment and ongoing operating costs for plant cooling.

It has now been found, however, in accordance with the teaching of the instant invention that these and other shortcomings of the prior art waste heat disposal systems can, in large measure, be overcome by the simple, yet unobvious, expedient of splitting the total cooling load between two or more open-looped evaporative cooling circuits serially connected to one another and arranged such that each circuit in the series has a manyfold greater dissolved solids tolerance than that circuit or those circuits ahead or upstream thereof. Using this general arrangement, a portion of the hot coolant being circulated in heat-exchange relation to the primary heat source is tapped off downstream of the latter and circulated in a separate non-evaporative cooling loop in heat-exchange relation to the succeeding higher capacity open-looped evaporative circuit before being returned thus cooled to the initial open-looped evaporative circuit upstream of the primary heat source. In addition, the pretreatment of the coolant to match the dissolved solids concentrating capacity of the successive evaporative cooling circuits is staged and the coolant blown down from one circuit is all that is treated for use as the coolant in the next.

The instant process realizes its maximum potential when utilized as a means for handling the total heat rejected from a given cooling system with no surface discharge of the water thus used to its source. In such an optimized system, reuse or saline water is substituted for good high quality water and total consumption is reduced through recycling it many times over that which can be tolerated if the water is returned to its source or otherwise uncontained. Moreover, the process of the present invention can be employed to advantage in conjunction with conventional evaporative cooling systems using reuse or saline water because the latter system when used alone would call for approximately fifteen times the solar evaporative capacity of the combined system due to the greatly increased wastewater volume generated thereby.

It is, therefore, the principal object of the present invention to provide a novel and improved waste heat removal process.

A second objective is the provision of a process of the class described that advantagouesly uses low quality water as a coolant while, at the same time, preventing environmental contamination.

Another objective of the invention forming the subject matter hereof is that of providing a waste heat disposal process that can be used in combination with other conventional evaporative cooling processes resulting in water conservation, wastewater volume reduction and a considerable lessening of the costs associated with the ultimate disposal of the wastewater.

Still another objective of the within described process is that of providing a way of achieving an optimum economic balance among such factors as wastewater volume and its associated disposal cost, the chemistry of the fluids circulating within the first and second open-looped evaporative circuits, and overall plant efficiency as these factors are influenced by constantly changing conditions such as the output demands made upon the plant.

An additional objective is that of providing a staged process for the disposal of waste heat wherein such successive stage has a greater dissolved solids tolerance than the one before it, the blowdown from one evaporative cooling circuit comprises the makeup coolant for the succeeding stage, and only such blowdown need be treated to accommodate the higher dissolved solids carrying capacity of the evaporative cooling circuit within which it is circulated as a coolant and concentrated.

Further objects are to provide a process for removing waste heat from a process cooling fluid or other primary heat source which is simple, versatile, environmentally acceptable, efficient, relatively maintenance-free, requires little ground for waste containment and is compatible with existing evaporative cooling installations.

Other objects will be in part apparent and in part pointed out specifically hereinafter in connection with the description of the drawings that follows, and in which:

FIG. 2 is a diagram showing a cell of the type of evaporator ideally suited for use in the system of FIG. 1 to remove the heat from the non-evaporative loop;

FIG. 3 is a fragmentary diagram to an enlarged scale showing the distribution of fluids and air across and between the heat-exchange surfaces; and, FIG. 4 is a nomograph representing the operational characteristics of the system at a chosen level of total dissolved solids in the second open-looped evaporative circuit.

Figure 1:
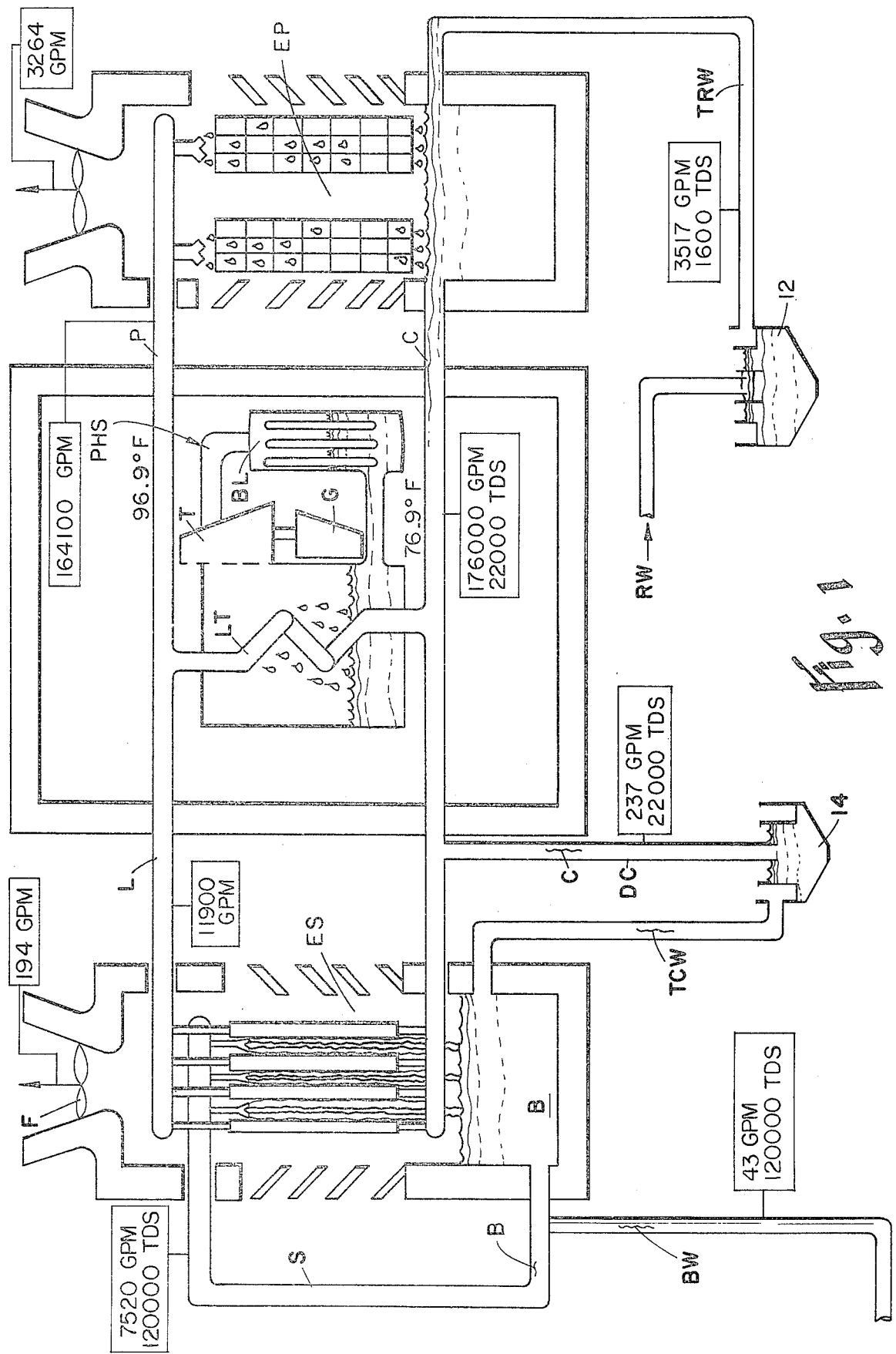
FIG. 1 is a flow diagram showing a two-stage waste heat disposal facility.

Referring next to the drawings for a detailed description of the present invention and initially to the flow diagram of FIG. 1 for this purpose, it will be seen that the waste heat disposal process forming the subject matter hereof has, among other features, a first or primary open-looped evaporative cooling circuit P and a secondary open-looped evaporative cooling circuit S each containing circulating fluids moving in heat-exchange relation to one another and to a forced airstream within evaporators EP and ES. In the particular form shown, the primary evaporative cooling circuit P contains coolant C while the secondary loop S contains brine B, the makeup to which loop is coolant blown down from the primary circuit in a manner to be explained presently.

In the diagram of FIG. 1, the makeup water RW is taken as needed from a reservoir or other source (not shown) and delivered for pretreatment to primary treatment facility 12. This pretreatment of the makeup water RW is performed as required in accordance with standard industry practice to bring the quality of the water so used up to a standard acceptable for use in the primary evaporative circuit P where it can be concentrated to a moderate level of say 22,000 mg/l of total dissolved solids (TDS) without exceeding either scaling, fouling or corrosion thresholds. The potential scaling problem comes from sparingly soluble compounds in the raw water such as calcium sulphate or some form of silica. Evaporation of the water to a total concentration level of 22,000 mg/l without treatment could concentrate these individual sparingly soluble compounds to a condition of super saturation at which point the compounds would come out of solution in the form of scale. It is common industry practice to treat water to avoid this potential scaling situation by such methods as selective ion removal or precipitation.

The makeup water RW, thus pretreated becomes treated raw water, TRW, which water is then added to the cooling water C circulating within the primary evaporative cooling circuit P. As the treated raw water TRW leaves the primary pretreatment facility 12, it enters the sump in the bottom of conventional evaporator EP to replenish the coolant lost through evaporation and drift. The coolant in the sump of evaporator EP is, of course, cool at this point having been subjected to evaporative cooling to remove excess sensible heat contained therein. As the coolant thus cooled leaves the sump of evaporator EP, it moves in heat-exchange relation to a primary heat source which has been broadly designated by PHS. PHS in the diagram of FIG. 1 comprises a conventional fossil-fuel power plant containing a boiler BL, a turbine T, a generator G, and a condenser, the tubes of which are represented by duct LT. No useful purpose would be served by going into the details of such a plant since its only significance is that of a heat source. Coolant C, heated by the steam condensing on condenser tubes LT, is returned to evaporator EP where the excess heat is removed therefrom in the conventional way. Up to this point, of course, the process is entirely conventional and no novelty whatsoever is predicated thereon. It is from this point on, however, that the novelty in the process becomes apparent.

Coolant C circulating within primary evaporative circuit P is concentrated to a preselected level of, say, 22,000 mg/l of TDS which the raw makeup water RW has been pretreated in facility 12 to accommodate through evaporation without appreciable scaling, biofouling or corrosion. It is important to note that essentially all the makeup water required to replenish the coolant lost in the primary evaporative circuit P must be thus pretreated. Now, still with reference to FIG. 1, it can be seen that a portion of the hot coolant C is tapped off downstream of the primary heat source PHS and circulated in a separate non-evaporative cooling loop L where it passes in heat-exchange relation with the brine B circulating within the secondary evaporative cooling circuit S. Loop L is, for all practical purposes, a closed loop as will be explained presently in connection with FIGS. 2 and 3 since the only direct communication the coolant C has with the atmosphere is through primary evaporative circuit P that comprises an open-loop as does the secondary evaporative circuit S.

By tapping into the primary circuit P downstream of the primary heat source PHS, the net effect is one of splitting the total heat load between loops P and L. In other words, evaporator EP need remove only that heat contained in coolant C which is circulating within primary evaporative circuit P while the remainder is removed by the brine B circulating within the second open-looped evaporative circuit S by means of secondary evaporator ES.

Now, the coolant C circulating in loops P and L is evaporated and thereby concentrated to the point where the dissolved solids contained therein reach the predetermined level above which unacceptable scaling, biofouling or corrosion will begin to take place. This threshold point above which further evaporation would cause problems usually stems from the residue of the sparingly soluble compounds which have been concentrated by evaporation to a point of near saturation. Coolant C is then blown down in duct DC and pretreated in facility 14 to accommodate further evaporation without appreciable scaling or fouling. The individual treatment procedure is dependent upon water chemistry. The treatment procedure would usually include a softening process such as that previously described for facility 12 which would enable the treated coolant water TCW to accommodate further evaporation without appreciable scaling or biofouling. After treatment in facility 14, the treated coolant water, TCW, is then added to the cooling brine B which is circulating in evaporative loop S. In the preferred configuration, non-metallic materials of construction are used in the evaporative loop S for the purposes of eliminating the need for corrosion treatment in facility 14 and resisting the corrosion potential in the highly saline brine used for coolant in loop S. It is of considerable importance to note that the makeup coolant (TCW) volume for the second evaporative cooling circuit, is only a small fraction of that required for the primary circuit, it consisting in the particular form shown solely of coolant C blown down from the latter. Thus by staging the two evaporative cooling circuits P and S so as to match their specific and altogether different demands, it becomes possible to perform two independent hardness removal treatments on the water which originally entered the system as raw water RW.

The independent treatment performed in facilities 12 and 14 make possible a multiplicative performance effect with respect to the overall cycles of concentration achieved by the combination of evaporators EP and ES, "cycles of concentration" being defined as the overall ratio of raw water makeup volume divided by the wastewater discharge volume, (RW/BW). For example, if 100 units of raw water is introduced into treatment facility 12 after being suitably treated and then introduced into circuit P, it can be reduced by evaporation to, say, 20 units of coolant C. At this stage, the concentration cycles in primary circuit P would be 100/20 or 5. If, then, this some 20 units of coolant C is treated in treatment facility 14 preparatory to introduction into circuit S where, in a similar manner, it is reduced by evaporation to one unit of brine B which is eventually blown down as only one unit of brine waste BW, then the concentration cycles in circuit S would be 20/1 or 20. Of course, the overall concentration cycles or RW/BW would be the product of the two, that is $5 \times 20$ or 100.

The treated coolant water TCW enters the sump of the second stage evaporator ES where it becomes the makeup to the circulating brine B. Brine B is circulated in heat-exchange relation to the coolant circulating within the non-evaporative loop L of the first stage cooling system. Evaporator ES, as will be shown presently, is different from the primary evaporator EP in that it is capable of concentrating the circulating brine B to a TDS level in excess of 100,000 mg/l. Moreover, this highly concentrated brine B is maintained entirely separate from the coolant C circulating within the first stage cooling system which, of course, cannot accommodate it. A portion of this highly concentrated brine is blown down as waste brine WB and is subjected to tertiary treatment such as evaporation in on-site solar ponds, crystallization, thermal evaporation or the like. By staging the cooling load as noted above, the amount of concentrated brine wasted or subjected to tertiary treatment is a very small fraction of the total makeup water supplied to the system.

Reference will next be made to FIGS. 2 and 3 where it will be seen that the heat-exchanger ES which is of a design preferably used in the process described herein also forms the subject matter of copending application Ser. No. 063,797 filed Aug. 6, 1979, the latter application and this one having one inventor in common. Hot coolant C circulating within non-evaporative loop L of the first stage cooling system is distributed among a plurality of reservoirs 16 contained within the header atop the evaporator using a suitable distribution manifold 18. In like manner, the brine B circulating within the secondary open-looped evaporative circuit S is similarly fed into a group of brine reservoirs 20 interspersed between adjacent pairs of coolant reservoirs 16 while, at the same time, remaining separated therefrom.

The cooling water C and the brine B leave their respective reservoirs 16 and 20 through nozzles 22 shaped to distribute these fluids in the form of thin films FC and FB onto opposite surfaces of vertically disposed heat transfer surfaces H. Both fluids C and B gravitate down the vertically disposed heat transfer surfaces in concurrent flow relation while the former, which is hot, transfers its waste process heat to the latter which is relatively cooler. The hot coolant thus cooled is drawn off at the bottom of closed chambers 24 where it is recombined and returned to non-evaporative loop L preparatory to, once again, joining the primary evaporative circuit P. The brine, on the other hand, is collected in the sump in the bottom of evaporator ES.

Interposed between adjacent chambers 24 and defined by the vertically disposed heat transfer surfaces H bordering the latter on both sides are a series of air passages 28 open at both ends. Air flows through these air passages 28 in response to a pressure gradient induced by fans F of FIG. 1. The air passes in cross-flow relation to the descending film of brine FB gravitating down the exposed surfaces of heat transfer surfaces H. As these air currents flow across the film of brine and exit the top of the evaporator ES, they effect evaporative cooling thereof in the well-known manner. The dissolved solids contained within the brine, of course, become more and more highly concentrated as the evaporative cooling process continues.

Now, in the preferred embodiment of the instant invention, heat transfer surfaces H and all other surfaces exposed to brine B are non-metallic so that a high concentration of dissolved solids in the brine B can be tolerated before corrosion becomes a problem. TDS in the wastewater loop can go as high as 120,000 mg/l provided the coolant C leaving the primary cooling stage is properly pretreated at facility 14 to prevent scaling and fouling.

The operation of the previously described staged system is represented mathematically by a single simple equation interrelating system makeup solids concentration, circuit P total dissolved solids concentration, circuit S total dissolved solids concentration and the fraction of the plant heat load dissipated in evaporative cooling circuit S, thus:

$$K = \frac{a(b-c)}{c(b-a)} \tag{1}$$

Where:
- a is total dissolved solids level (mg/l) in the makeup cooling water (RW) entering the power plant.
- b is the total dissolved solids level (mg/l) in the second open loop water B.
- c is the total dissolved solids level (mg/l) in the first open loop water C.
- K is the fraction of the heat dissipated in cooling circuit S or $Q_s/Q_t$, where $Q_t$ is the total plant heat load.

The solids level in RW is an independent variable defined by the plant water supply. Equation (1) states, therefore, that for a given heat load distribution, if the total dissolved solids level is fixed in one loop, the total dissolved solids level in the other loop is fully defined. This process variable relationship is unique to the instant system and allows operational flexibility not available by any other approach.

Equation (1) was derived from mass balances on water and consideration of the total dissolved solids in the system as well as from psychrometric considerations of the evaporative cooling circuit operation. The following equations are sufficient to define the process mass balance at all cooling system operating conditions.

Overall Water Balance $$RW = BW + X + Y \quad (2)$$

Where:
RW is the makeup water to the cooling system and first evaporative circuit P (#/hr).
X is the water evaporated in the first open-loop evaporative circuit P (#/hr).
Y is the water evaporated in the second open-loop evaporation circuit S (#/hr).
BW is the brine blown down from the second evaporative circuit S (#/hr).

Second Evaporative Circuit Water Balance $$TCW = BW + Y \quad (3)$$

Where:
TCW is the treated cooling water makeup to the second evaporative circuit S.

Overall Total Dissolved Solids Balance $$RWa = BWb \quad (4)$$

Second Evaporative Loop Total Dissolved Balance $$RWa = TCWc \quad (5)$$

Through psychrometric relationships it can be shown that at a given set of atmospheric conditions and cooling water temperatures, the evaporation of water in either loop is proportional to the heat dissipated in that loop. Therefore:

$$K = \frac{Q_s}{Q_t} = \frac{Y}{X + Y} \quad (6)$$

Equations (2) through (6) were used to derive equation (1). Examination of Equations (2) through (6) shows that for a given plant heat load and for a given K, the two following operational facts result.
1. Flows RW, BW and TCW are not independent. Setting one of the three flows defines the other two.
2. The loop total dissolved solids concentrations, b and c, are completely defined when one of the above flows is set.

Figure 4:
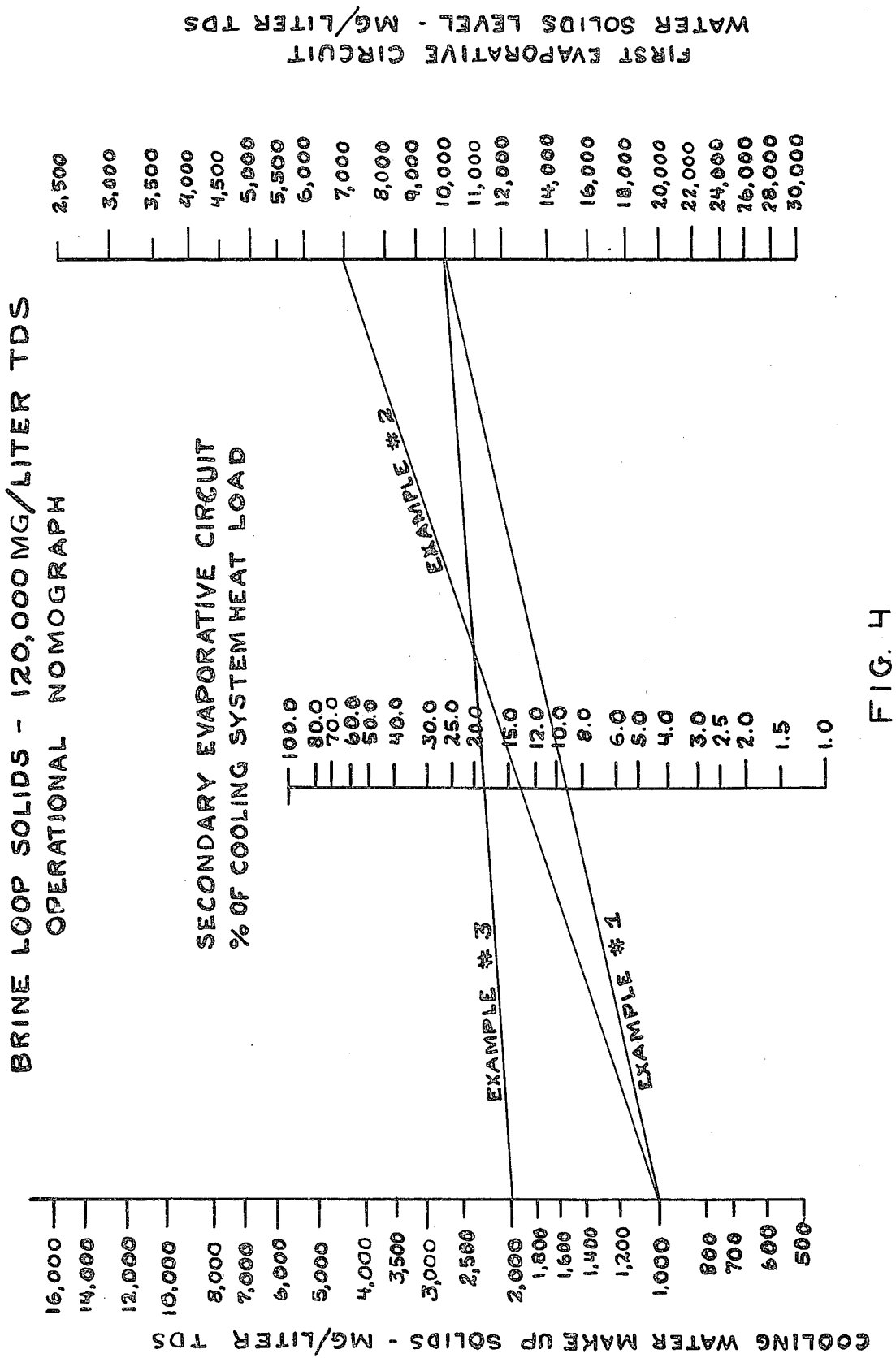

Next, with reference to FIG. 4, it will be seen to be a nomograph describing the operational characteristics of the system at specific value of b (i.e., 120,000 mg/l TDS). Three examples are displayed which reveal the unique operational characteristics and flexibility of the system. Example 1 shows the operating point of the process when incoming cooling water RW is at 1,000 mg/l TDS and the secondary evaporative loop contributes 9% of the total cooling. In this case the first evaporative loop water C will contain 10,000 mg/l total dissolved solids. The first loop runs at 10 cycles of concentration and the second loop at 12 cycles.

Assume next that the fraction of scale forming species in the supply water increases. If this occurs, the operator simply changes the heat load ratio between the two evaporative circuits as shown in example 2. The first evaporative loop now operates at 7 cycles of concentration keeping it below scaling thresholds while the more tolerant second evaporative loop operates at 17 cycles of concentration. Note, however, that the total system concentration cycles is the same in both examples 1 and 2.

On the other hand, if we assume that dry weather has caused the RW total dissolved solid level to double to 2,000 mg/l, then example 3 shows that by simply changing the heat load ratio, one can maintain the total dissolved level in the first evaporative loop cooling water C below values which could cause corrosion in the power plant. In this instance there are 5 cycles of concentration in the first evaporative loop and 12 cycles in the second loop.

In the nomograph of FIG. 4 and the three examples described above, all were cases where the second evaporative loop water B concentration b was maintained at 120,000 mg/l total dissolved solids. Given any of the above conditions, the loop concentrations, concentration cycles and ultimate waste volume flow could be further modified simply by changing the value of b. Each specific concentration of b could and would be represented by a separate nomograph.

In the final analysis, it is important to note that the power plant efficiency is a function of the heat load ratio because it affects cooling water temperature. There are three important elements affecting the power plant economics that can be profoundly influenced if not controlled in accordance with the teaching found herein. They are as follows:
Wastewater volume BW and its associated disposal cost.
First and second evaporative loop chemistry. System life, maintenance requirements and reliability are a function of this chemistry.
Power plant efficiency.

Thus, by employing the staged system and method of operating same forming the subject matter of the instant invention one can achieve an optimum economic balance between the above three factors based upon short-lived conditions such as plant load factor, ambient weather, and cooling water quality.

What is claimed is:
1. The improved process for removing waste heat which comprises: connecting a first open-looped evaporative cooling circuit with a known maximum dissolved solids concentrating capacity in heat-exchange relation with a primary heat source, providing a second open-looped evaporative cooling circuit with a several-fold greater dissolved solids level concentrating capacity than the first, continuously supplying makeup liquid to the coolant circulating within the first open-looped circuit, said makeup liquid having a total dissolved solids concentration several times lower than the solids concentrating capacity of said first circuit, tapping off a portion of the hot coolant circulating within the first open-looped circuit on the downstream side of the primary heat source for use as a secondary heat source for the second open-looped circuit, blowing down a portion of the coolant circulating in the first open-looped circuit and using same as the makeup liquid to the coolant circulating within the second open-looped circuit, passing the secondary heat source in heat-exchange relation to the coolant circulating within the second open-looped circuit before passing same thus cooled in heat-exchange relation to the primary heat source, and continuously removing that quantity of coolant from the second open-looped circuit as is required to maintain the dissolved solids concentration therein at a level less than the maximum it can tolerate.

2. The improved process of claim 1 which includes the step of first pretreating all of the makeup liquid supplied to the coolant in the first open-looped circuit to a softness and corrosion potential level compatible with the maximum dissolved solids concentration that said first open-looped circuit can tolerate while secondarily pretreating only that coolant blown down from the first open-looped circuit and added to the second open-loop circuit to the softness level compatible with the much higher maximum concentration of dissolved solids that can be tolerated within the second open-looped circuit.

3. The improved process of claim 1 which includes the step of wasting the coolant withdrawn from the second open-looped circuit to one or more solar ponds.

4. The improved process of claim 1 wherein the portion of the hot coolant tapped off from the first open-looped circuit that comprises the secondary heat source for the second open-looped circuit is circulated within a third non-evaporative loop, said portion while circulating in said third loop being isolated from the atmosphere, and said portion only being accessible to the atmosphere upon its return to said first open-looped circuit.

5. The improved process of claim 4 wherein the secondary heat source circulating within the third loop remains physically isolated from the coolant circulating within the second open-looped circuit.

6. The improved process of claim 1 wherein the coolant is blown down from the first open-looped circuit at a rate selected to maintain a predetermined dissolved solids concentration in at least one of said first and second open-looped circuits.

7. The improved process of claim 1 wherein the coolant is withdrawn from the second open-looped circuit at a rate selected to maintain a predetermined dissolved solids concentration in at least one of said first and second open-looped circuits.

8. The improved process of claim 1 wherein the makeup liquid to the coolant circulating the first open-looped circuit is added at a rate selected to maintain a predetermined dissolved solids concentration in the coolant circulating in at least one of said open-looped circuits.

9. The improved process of claim 1 wherein the division of the waste heat load shared between the first and second open-looped evaporative cooling circuits is shifted therebetween by varying at least one of the air and liquid flow rates in at least one of said open-looped circuits.

10. The improved process of claim 1 wherein the first open-looped circuit is selected to operate up to a total dissolved solids concentration of approximately 20,000 mg/l.

11. The improved process of claim 1 wherein the second open-looped circuit is selected to operate at a total dissolved solids content in excess of 100,000 ppm.

* * * * *